United States Patent [19]

Nigol et al.

[11] 4,291,194

[45] Sep. 22, 1981

[54] NEGATIVE CORONA SHIELDING OF LINE AND STATION HARDWARE

[75] Inventors: Olaf Nigol, Etobicoke; Herbert J. Houston, Oakville; Adolf Gretzinger, Ancaster, all of Canada

[73] Assignee: Slater Steel Industries Limited, Hamilton, Canada

[21] Appl. No.: 56,203

[22] Filed: Jul. 10, 1979

[51] Int. Cl.³ .................... H02G 7/05; H01T 19/00; H01B 17/42
[52] U.S. Cl. .................... 174/40 R; 174/73 R; 174/127; 174/140 R; 174/141 R; 248/63
[58] Field of Search .................... 174/40 R, 73 R, 127, 174/140 R, 140 H, 140 S, 141 R, 142, 144; 248/63

[56] References Cited

U.S. PATENT DOCUMENTS

| | | | |
|---|---|---|---|
| 1,233,296 | 7/1917 | Austin | 174/140 S |
| 3,129,282 | 4/1964 | Flynn | 174/140 S X |
| 4,034,154 | 7/1977 | Lecat | 174/127 |

OTHER PUBLICATIONS

Cigre Report, Group 36, Aug. 24, 1974, pp. 28–32.

Primary Examiner—Laramie E. Askin
Attorney, Agent, or Firm—Fleit & Jacobson

[57] ABSTRACT

A conductor support member includes an external surface having a first portion thereon. The first portion is shaped to generate a localized increase in voltage gradient. Shielding means including surfaces intersecting to define a sharp edge are provided to promote a negative corona discharge adjacent the first portion. The said negative corona discharge produces a positive space charge to reduce the voltage gradient at the first portion. This inhibits the generation of positive corona discharge.

6 Claims, 10 Drawing Figures

NEGATIVE CORONA SHIELDING OF LINE AND STATION HARDWARE

This invention relates to electrical power transmission and in particular to method and apparatus for preventing energy loss, radio interference and other undesirable characteristics associated with conventional electrical power transmission systems.

It is common practice to transmit electrical power between a generator and consumer by means of aerially suspended conductors. It is preferable to transmit such power at as high a voltage as possible so that the resistive loss of the conductor is minimized. A conventional alternating voltage (AC) system therefore utilizes a transformer to increase the voltage generated by the power generating station and a number of aerially suspended conductors to transmit the power at high voltage to a number of substations where it is returned to a low voltage to be distributed to the consumers.

With aerially suspended systems, it is conventional to utilize the insulating properties of air to isolate the conductors and associated hardware.

In the design of high voltage (HV), extra high voltage (EHV) and ultra high voltage (UHV) transmission lines and stations, one of the controlling design parameters is the partial breakdown of the air surrounding the high voltage elements. This phenomenon is known as corona. Corona is audible, visible, it constitutes a power loss and is a source of radio interference (RI).

Corona discharge is caused by a partial breakdown of the insulating medium, usually air, due to the voltage gradient in the field surrounding the conductor exceeding a critical value.

The localized electric voltage gradient imparts sufficient kinetic energy to the free electrons to cause ionization of the neutral molecules by collison.

In the divergent high voltage field associated with AC transmission systems, the corona initiated in the peak regions of the positive and negative half cycle of the voltage is known as positive and negative corona respectively. The two types of corona differ both physically and in their effects.

With positive corona, the free electrons move towards the positive electrode and once they attain the required kinetic energy to ionize the neutral air molecules, an electron avalanche is unleashed towards the positive electrode. Once initiated, the discharge is sustained until it terminates on the positive electrode. This results in a relatively large current pulse during each positive half cycle of the applied voltage.

With negative corona, the free electrons move away from their negative electrode and as they attain the required kinetic energy to ionize the neutral air molecules, the electron avalanche proceeding away from the negative electrodes leaves a positive space charge cloud between the electron avalanche and the electrode. The positive space charge so formed alters the electric field gradient, particularly at the tip of the electron avalanche, resulting in the suppression of the partial breakdown process.

The magnitude and duration of the negative corona current pulses are too small to cause objectionable RI in fair weather. Therefore, RI from high voltage (AC) lines and stations under fair weather conditions is caused entirely by the positive corona discharge.

When designing aerially suspended EHV and UHV systems, it is usual to provide a number of conductors in relatively close proximity interconnected by appropriate support members. This is known as a bundle of conductors and can comprise two, three, four or more individual conductors. Each conductor sets up its own electrical field. The potential or voltage gradient in the vicinity of conductors is inversely proportional to the distance from the surface of the conductor. With a bundle of conductors the potential and the voltage gradient at a given point is equal to the sum of the individual components from each conductor. Thus for each configuration of bundle, a field of the varying potential and voltage gradient is developed.

Hardware located within the periphery defined by the conductors of a bundle where the voltage gradient is relatively low is not susceptible to corona discharge. However, it is necessary for certain hardware to extend beyond the periphery of the bundle where the voltage gradient is sufficiently high to induce positive corona discharge.

Two different techniques have been developed for controlling positive corona discharge. The first technique is to design the hardware outside the periphery defined by the bundle with relatively large surface contours which results in a voltage gradient on the surface of the hardware below the corona inception voltage gradient for the respective operative conditions for the line or station. A problem with this arrangement, however, is that additional mass is frequently added over and above that required for the hardware to perform its purely mechanical function. This of course adds to the expense of the hardware and also increases the mechanical loading of the conductors.

The second approach has been to utilize tubular auxiliary rings known as grading and/or shielding rings. This however requires additional support assemblies to mount the rings in the correct location and again increases the cost and adds unwanted weight to the system.

A further disadvantage associated with both techniques is that the contours or shield rings require matching with the particular power transmission systems. Thus for each voltage range contemplated, it is necessary to redesign or modify existing components to ensure that the voltage gradient does not exceed the inception value for positive corona discharge.

It is therefore an object of the present invention to provide a power transmission system in which the above disadvantages are obviated or mitigated.

According to the present invention, there is provided a conductor support member comprising an external surface having a first portion thereon, the first portion being shaped to generate a localized increase in voltage gradient at the first portion of the external surface, and shielding means including convergent surfaces and intersecting to define a sharp edge to promote a negative corona discharge adjacent the first portion, whereby the negative corona discharge produces a positive space charge to reduce the voltage gradient at the first portion.

The production of a positive space charge reduces the voltage gradient on the surface of the high voltage components so that the inception of positive corona is suppressed.

Since the inception of negative corona occurs at a lower voltage than positive corona, a positive space charge is formed prior to the voltage gradient reaching the inception value for positive corona discharges. Further it has been found that an increase in voltage or a change in other conditions will enlarge the negative corona discharge in direct proportion to the increase in voltage. Thus the suppression of positive corona discharge is self regulating and it is not necessary to design each item of hardware for a particular voltage range.

A further advantage with the present invention is that the hardware components may be designed primarily from a mechanical functional standpoint and the negative corona generating means will inhibit the formation of positive corona discharge.

The negative corona inhibiting means can consist of sharp edged hardware components, sharp edged attachable metallic stampings, fine wire overlay, or other conductive elements that will produce sufficient amount of positive space charge during the negative half cycles of the applied voltage at all critical field locations.

Embodiments of the invention will now be described by way of example only with reference to the accompanying drawings, in which.

Figure 1:
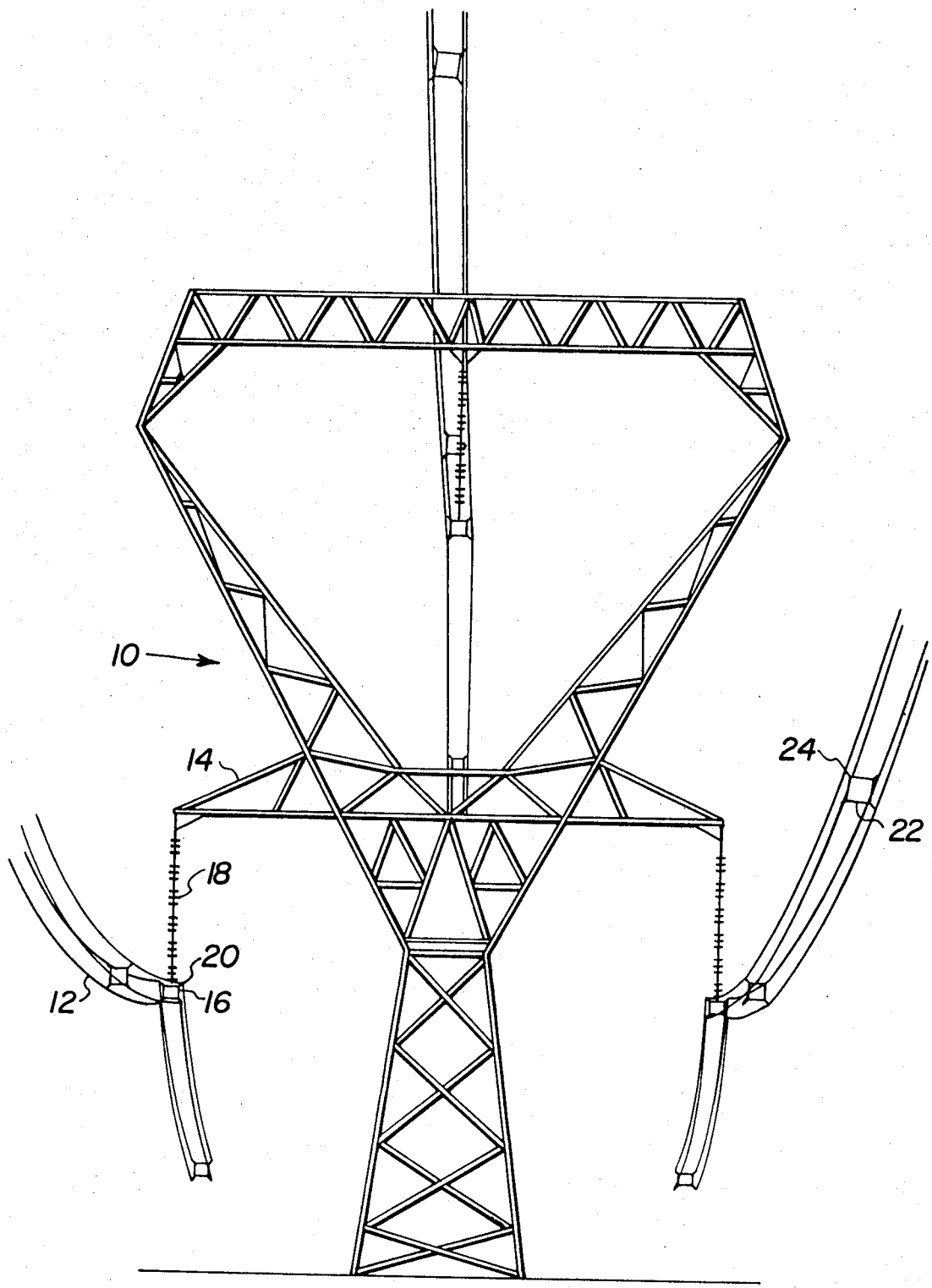
FIG. 1 is a general view showing diagrammatically a portion of an aerially supported electrical power transmission system.

Referring now to FIG. 1, an aerially supported electrical power transmission system includes a number of pylons 10 (only one of which is shown) which are spaced apart at appropriate intervals and support a number of conductors 12. The conductors are arranged in bundles and each bundle is suspended from the arms of the pylon 10. The conductors are connected to the apices of a suspension plate 16 which is in turn connected to the arm 14 by means of insulator strings 18. The conductors are connected to the plate 16 by clamps 20.

The conductors 12 of the bundle are maintained in spaced relationship intermediate the pylons 10 by means of spacer brackets 22. Clamps 24, similar to the clamps 20, connect the conductors 12 to the apices of the spacer brackets 22.

The spacer brackets 22 may include a damping mechanism of known construction to inhibit relative movement between the conductors.

Each conductor carries an AC voltage which may be as high as 900,000 volts, root mean square (RMS), and thereby generates a localized high voltage gradient on the surface of the conductor.

Figure 2:
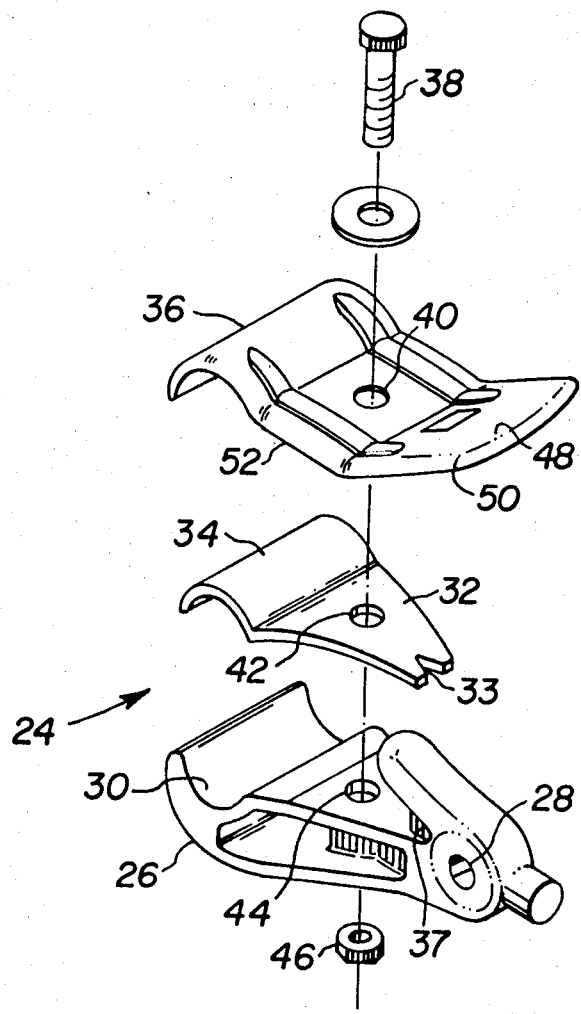
FIG. 2 is a perspective exploded view showing a clamping member fitted with a shield.
Figure 3:
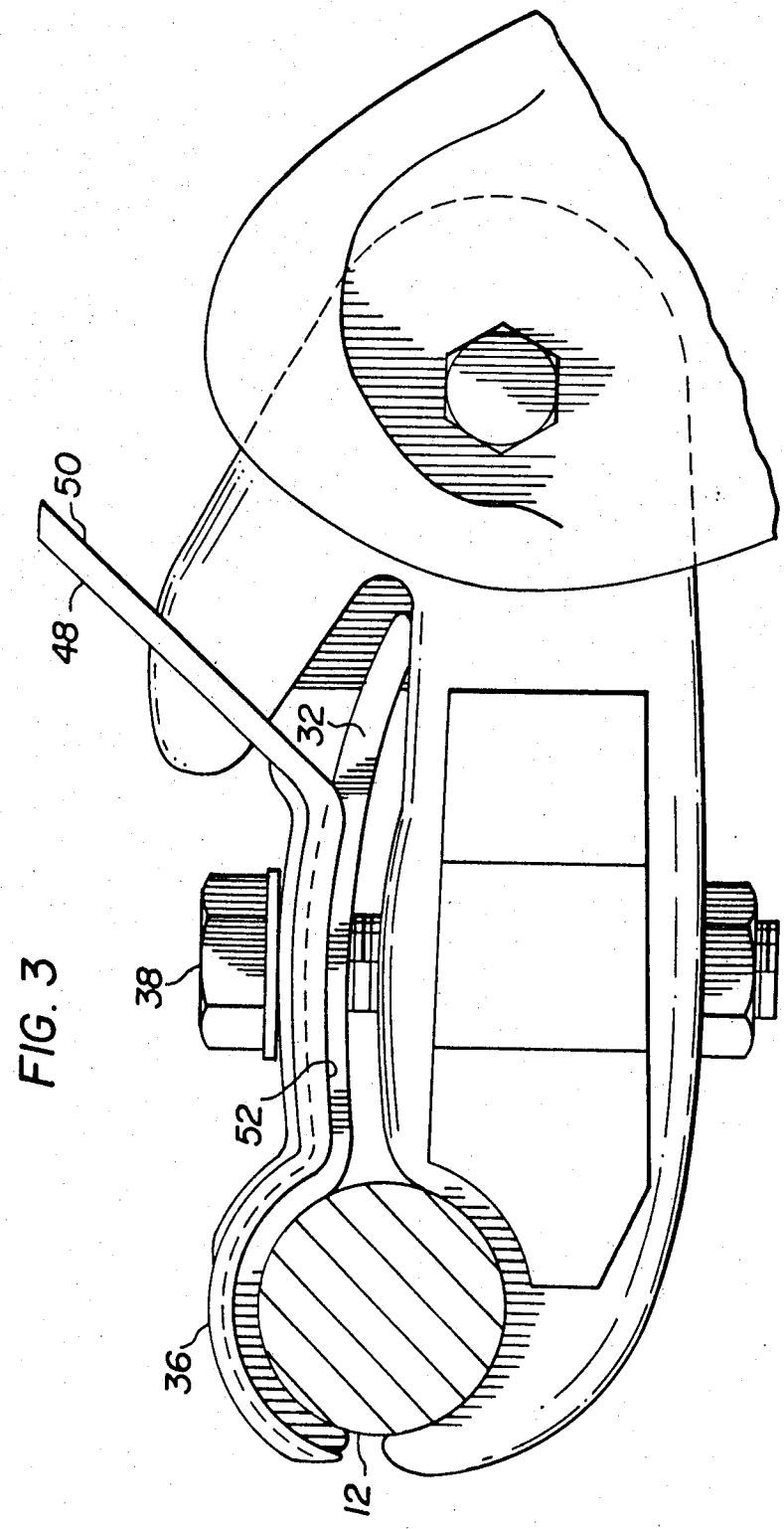
FIG. 3 is an enlarged elevation of the clamp shown in FIG. 2.

Referring now to FIG. 2 the clamp 24 comprises a body 26 which is adapted to be connected to the spacer brackets 22 by way of a throughbore 28. A semi-circular recess 30 is provided at the opposite end of the body 26 to the throughbore 28 to receive the conductor 12. A clamping member 32 is located above the body 26 and is formed with an arcuate portion 34 to co-operate with the recess 30 and partially encompass the conductor 12. A notch 33 is formed at the opposite end of the clamping member to the arcuate portion 34 and engages an upstanding rib 37 provided on the body 26.

A shielding plate 36 overlies the clamping member 32 and body 26 and is secured by a bolt 38 which extends through bores 40, 42, 44 in the shield, clamping member and body respectively. The bolt 38 is secured by a nut 46 so that the bolt 38 interconnects the clamping member and body and ensures that the conductor is firmly gripped by the clamp 24. It will be apparent therefore that the extremity of the recess 30 and arcuate portion 34 lie outside the periphery of the bundle defined by the conductors 12 and are therefore susceptible to positive corona discharge.

The shielding plate 36 is defined by upper and lower surfaces 48, 50, respectively. The upper and lower surfaces converge at the periphery of the shielding plate to define a sharp edge 52 which extends completely around the periphery.

In operation, the sharp edge 52 increases the voltage gradient at the periphery of the shielding plate 36 and thereby generates negative corona discharge at a lower potential than the inception of positive corona discharge. A positive space charge is thus generated about the shielding plate and envelopes the extremities of the recess 30 and arcuate portion 34. The positive space charge reduces the potential gradient at the surface of the clamp 24 so that during positive half cycles the potential gradient necessary to generate localized positive corona discharge is not attained.

It is believed that the negative corona acts to modify the electric field produced by the conductor and provides an electrostatic equipotential surface that is equivalent to a large curved surface previously utilized to inhibit positive corona discharge. It has been found that the extent of the positive space charge increases with increased voltage and thereby automatically regulates the negative corona to prevent positive corona discharge. A further advantage is that the negative corona is generated at the point where positive corona is likely to occur. Thus the most susceptible point of positive corona discharge is shielded.

The utilization of the shield 36 enables the clamp 24 to be designed according to parameters dictated by its mechanical function and avoids the necessity to provide additional mass to enable contouring of the surface.

In comparative tests between a conventional clamp and a similar clamp fitted with a shield 36 it was found that positive corona occurred with the conventional clamp at an applied voltage of 290 kV RMS. The clamp fitted with the shield 36 was tested up to 367 kV RMS at which time no positive corona was observed from the clamp. However corona had occurred on the bus of the test apparatus. It will be appreciated that corona discharge on the bus represents the upper limit of the test apparatus so that the full capability of the shielded clamp could not be utilized.

In a further test, positive corona was observed at 310 kV RMS with a conventional clamp whereas an applied voltage of 376 kV RMS failed to produce similar positive corona discharge from the shielded clamp.

Figure 4:
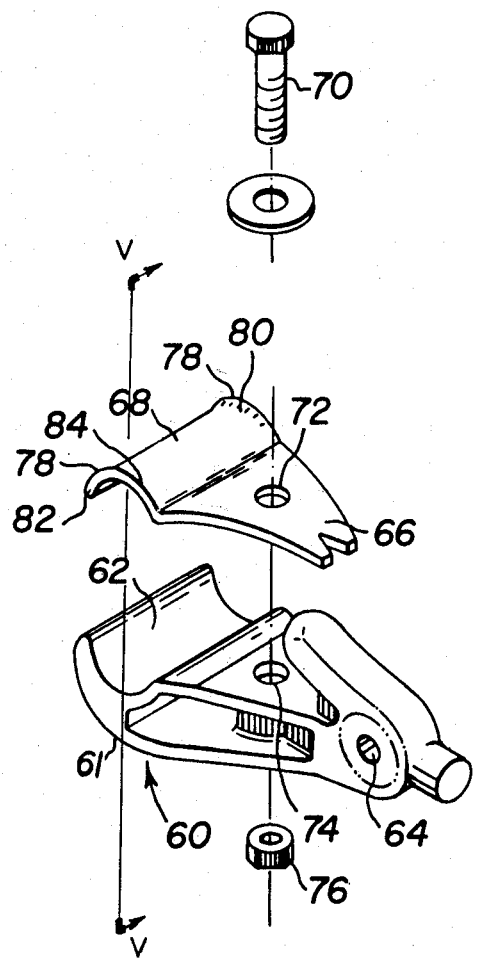
FIG. 4 is an exploded perspective view showing an alternative embodiment of a clamping member.

A further embodiment of the clamp is shown in FIG. 4. This clamp 60 includes a body 61 formed in an arcuate recess 62 at one end thereof to embrace a conductor 12. A throughbore 64 is provided to permit connection of the body to a bracket. A keeper 66 is provided with an arcuate portion 68 which cooperates with the body portion to define an aperture to accommodate a conductor 12. The clamping plate 66 is connected to the body 61 by means of a bolt 70 which passes through bores 72, 74 in the plate and body, respectively. A nut 76 secures the bolt in position.

Figure 5:
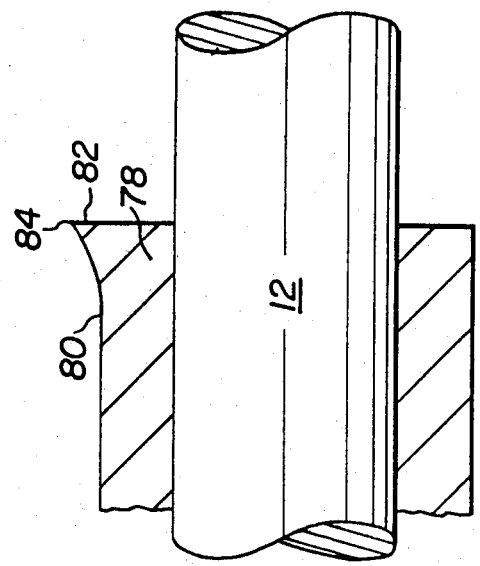
FIG. 5 is a view on the line V—V of FIG. 4.

The clamping plate 66 is provided with a raised edged portion 78 extending along the periphery of the arcuate portion 68. The raised portion 78 has an upper surface 80 and a side surface 82 which converge to define a sharp edge 84 shown in FIG. 5.

In operation the sharp edge 84 generates a positive space charge during negative half cycles which modifies the electric field surrounding the extremities of the clamp and inhibits positive corona discharges during positive half cycles.

Figure 6:
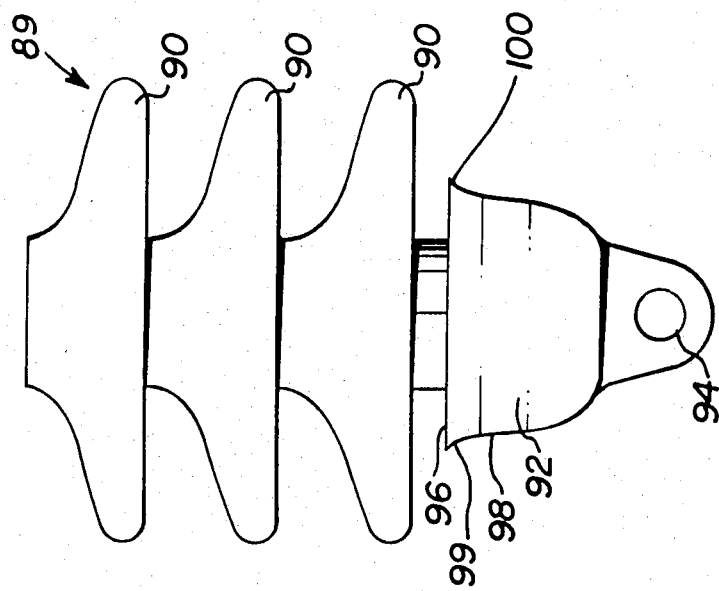
FIG. 6 is an elevation of an insulating string for suspension from a pylon.

FIG. 6 shows an arrangement of a portion 89 of an insulating string which comprises a series of generally conical insulators 90. The string is formed from a number of integrally molded synthetic plastics components which are joined to one another to form a string. Each molding defines three or four conical insulators. The string is arranged to be suspended from the arm 14 to the support frame 16 of FIG. 1. At the lower end of the lowermost molding the insulator 90 is provided with a connecting member 92 to facilitate connection of the string to the frame 16. The connecting member 92 has a throughbore 94 which accommodates a bolted connection with the support frame 16.

The connecting member 92 has an upper planar surface 96 and an outer peripheral surface 98. The upper end 99 of the peripheral surface 98 extends radially outwardly and converges towards the upper surface 96. A sharp edge 100 is defined at the junction between the peripheral surface 98 and the upper planar surface 96.

The junction between the connecting member 92 and the insulators 90 in conventional insulator strings causes a high voltage gradient which can lead to positive corona discharge. However in the connecting member shown in FIG. 6 the sharp edge 100 induces a negative corona discharge which modifies the electric field at the junction of the insulator body and connecting member and thereby reduces the potential gradient. Since this appears at a lower potential than the formation of a positive corona discharge, the formation of positive corona discharge is inhibited. Hence it is not necessary to use the shielding rings normally associated with the connection between the insulator strings and the support members.

The connecting member 92 may be made from a metal shell with an insulating material cast within the shell. In this case the upper edge 99 of the shell will constitute a sharp edge to generate negative corona discharge.

Figure 7:
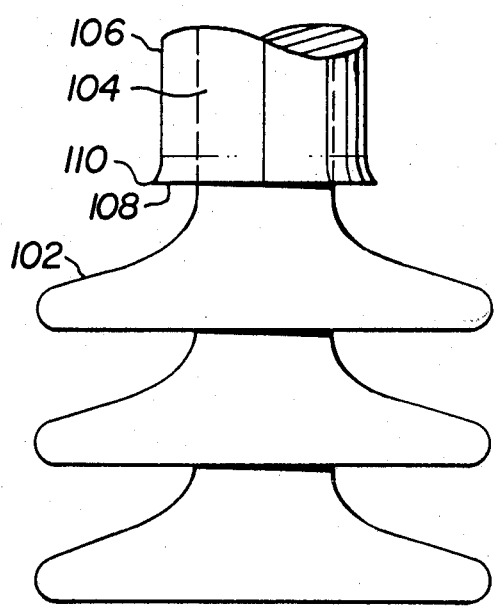
FIG. 7 is an elevation of a bushing top connector for mounting on top of a pylon.

FIG. 7 shows a similar arrangement to FIG. 6 in use on a bushing top connector. Insulating members 102 are connected to a support member 104 which has an outer circumferential surface 106. A planar surface 108 merges with the circumferential surface 106 to define a sharp edge 110. This sharp edge induces negative corona discharge which modifies the electropotential field. This reduces the potential gradient and inhibits the generation of positive corona discharges.

Figure 8:
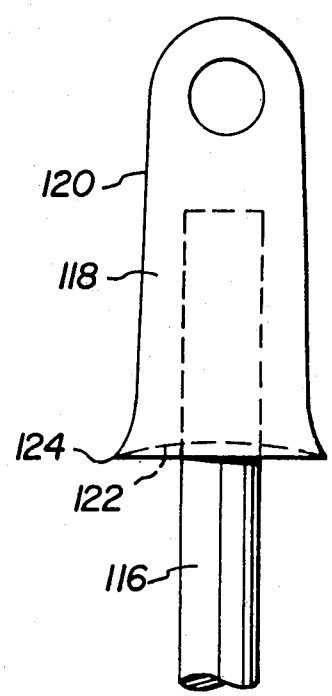
FIG. 8 is a live line tool end fitting used in conjunction with an insulating device.

FIG. 8 shows a live line tool end fitting. This fitting is placed at an end of an insulating rod which may be used to support a conductor temporarily to enable maintenance and repair work to be undertaken without interrupting the power transmission.

An insulating rod 116 is received in an end fitting 118 which has an outer circumferential surface 120. The rod 116 is received in an end face 122 which is dished so that the radially outer portion of the face extends further along the surface of the rod 116 than the radially innermost portion of the face 122. The circumferential surface 120 is flared at the end adjacent the end face 122 and merges with the end face 122 to define a sharp edge 124.

The junction between the insulating rod and the end fitting results in a high voltage gradient which renders the junction susceptible to positive corona discharge. This large voltage gradient may also result in a breakdown of the insulating properties of the rod adjacent to the junction which results in flashover or complete failure of the insulating rod.

However, the provision of the sharp edge 124 generates negative corona which modifies the electric field surrounding the junction of the end fitting 118 and insulator rod 116 and reduces the potential gradient at the junction. A similar arrangement may also be provided on end fittings of insulating rods which are used to support bus bars in power stations. In this case, the use of shielding rings normally associated with such installations is obviated.

Figure 9:
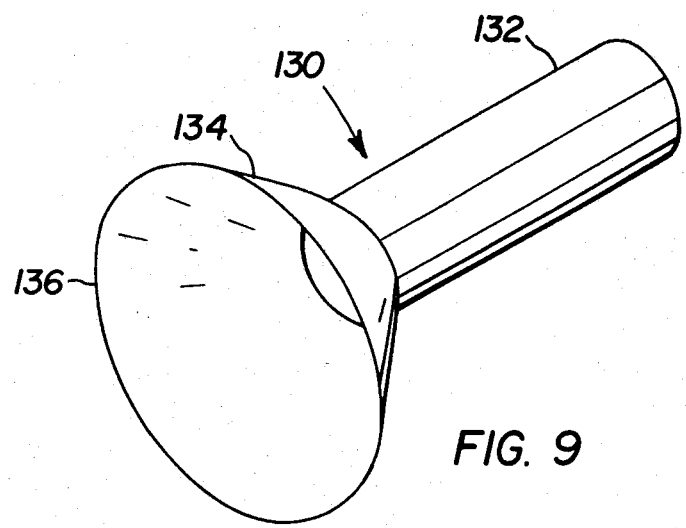
FIG. 9 is a shielding member for an end of a bus bar.

FIG. 9 shows an end fitting for a bus bar which reduces the high voltage gradient that occurs at the end of a bus bar. The end fitting 130 comprises a tubular body portion 132 and a conical flange 134. The flange terminates in a sharp edge 136. The tubular portion 132 fits over the end of the bus bar and the sharp edge 136 generates a negative corona discharge which reduces the potential gradient at the surface of the conical portion 134.

It is possible to manufacture the end fitting 130 with a radially extending flange. However the use of the conical portion 134 permits the body portion and flange to be welded and for the weld to be located within the flange portion.

Figure 10:
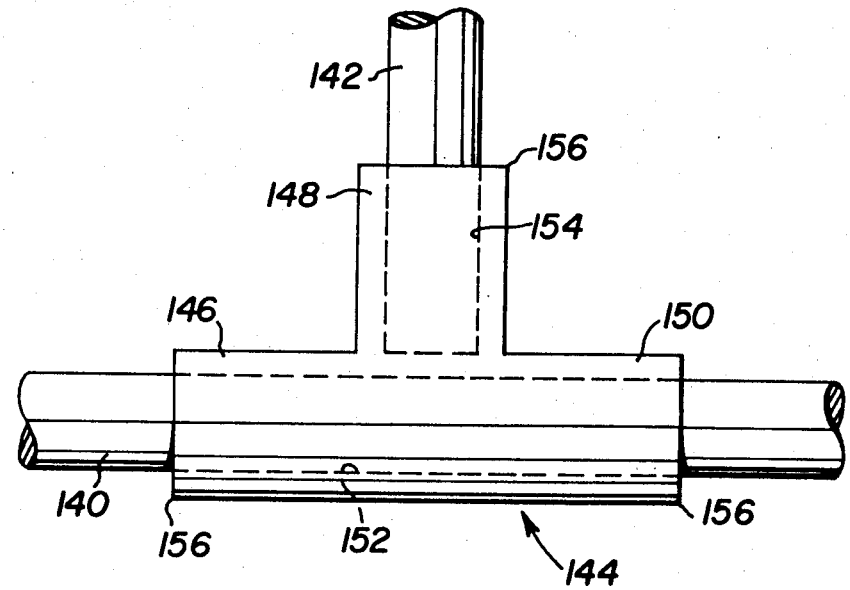
FIG. 10 is a T-connector for connecting two bus bars.

FIG. 10 shows a T-connector for connecting two bus bars 140, 142 at right angles. The T-connector 144 has three branches 146, 148 and 150 respectively. A throughbore 152 is provided between the branches 146 and 150 to accommodate the bus bar 140. A throughbore 154 is provided in the branch 148 to accommodate the bus bar 142.

Each branch terminates in a sharp edge 156 which provides negative corona discharges prior to the inception of positive corona discharges. The negative corona discharges emanating from each sharp edge 156 modify the electric force field surrounding the T-connector and reduce the potential gradient on the surface of the connector.

Similar arrangements may be effected with L-connectors and X-connectors to permit the connection of the bus bars in any desired configuration without the necessity for additional shielding rings.

From the above it will be apparent that the present invention provides a unique method of inhibiting positive corona discharge by the generation of a negative corona shield at critical locations of the hardware associated with electrical power transmission systems. Moreover the shielding effect is self regulating in that high potentials carried by the conductors result in increased shielding against positive corona discharge. This is achieved without the requirement for conventional auxiliary hardware such as shielding rings and clearly results in economy of manufacture and improved performance of the electrical power transmission system.

We claim:

1. A clamp for use with a conductor comprising:
   a body member having an axially extending arcuate-shaped recess formed therein for receiving the conductor;
   a clamping member having an axially extending arcuate-shaped recess formed therein cooperating with the recess in the body member to clamp the conductor and an external surface having a first portion thereof shaped and structured to generate a localized increase in voltage gradient thereon;
   means for interconnecting said body member and said clamping member; and
   shielding means including convergent surfaces intersecting to define a sharp edge adjacent an end of the recess in one of the clamping member and body member to promote a negative corona discharge adjacent said first portion, said sharp edge being located in a plane extending perpendicular to the axis of one of the recesses, whereby said negative corona discharge produces a positive space charge to reduce said voltage gradient at said first portion.

2. A clamp according to claim 1 wherein said sharp edge extends around a peripheral portion of said clamping member.

3. A clamp according to claim 1 wherein said shielding means is a plate member having said sharp edge extending around the periphery thereof.

4. A clamp according to claim 1 wherein said sharp edge is provided on an extremity of one of said body member and said clamping member.

5. A clamp according to claim 1 wherein a plate is provided to overlie one of said body member and said clamping member, said plate having converging upper and lower surfaces to define said sharp edge.

6. A method of inhibiting positive corona discharge from a portion of one side of an external surface of a conductor clamp having an axially extending recess formed therein, said portion being shaped and structured to generate a localized increase in voltage gradient thereon, comprising the step of providing shielding means on said one side of said clamp for promoting negative corona discharge adjacent said portion, said shielding means having convergent surfaces intersecting to define a sharp edge so as to produce a positive space charge to thereby reduce the voltage gradient at said portion, the sharp edge being located in a plane extending substantially perpendicular to the axis of the recess.

* * * * *